(12) United States Patent
Eo et al.

(10) Patent No.: US 12,124,671 B1
(45) Date of Patent: Oct. 22, 2024

(54) METHOD FOR PROVIDING VISUAL SCRIPTS ON A ONE- SOURCE MULTI-USE SUPPORT PLATFORM AND COMPUTER-READABLE MEDIUM FOR PERFORMING THE SAME

(71) Applicant: INSWAVE SYSTEMS CO., LTD., Seoul (KR)

(72) Inventors: Se Yong Eo, Seoul (KR); Woog Lae Kim, Seoul (KR)

(73) Assignee: INSWAVE SYSTEMS CO., LTD., Seoul (KR)

( * ) Notice: Subject to any disclaimer, the term of this patent is extended or adjusted under 35 U.S.C. 154(b) by 0 days.

(21) Appl. No.: 18/662,623

(22) Filed: May 13, 2024

(30) Foreign Application Priority Data

May 12, 2023 (KR) .................. 10-2023-0061502
Dec. 22, 2023 (KR) .................. 10-2023-0189288

(51) Int. Cl.
  *G06F 3/048* (2013.01)
  *G06F 3/0481* (2022.01)
  *G06F 3/0484* (2022.01)

(52) U.S. Cl.
  CPC .......... *G06F 3/0481* (2013.01); *G06F 3/0484* (2013.01); *G06F 2203/04803* (2013.01)

(58) Field of Classification Search
  CPC .................... G06F 3/0481; G06F 3/0484
  See application file for complete search history.

(56) References Cited

U.S. PATENT DOCUMENTS

| | | | |
|---|---|---|---|
| 10,275,265 B1* | 4/2019 | Gould | G06F 3/0482 |
| 2006/0109975 A1* | 5/2006 | Judkins | H04M 3/5233 379/265.02 |
| 2013/0067363 A1* | 3/2013 | Gehani | G06F 3/0481 715/763 |

(Continued)

FOREIGN PATENT DOCUMENTS

| | | | |
|---|---|---|---|
| KR | 20020003334 A | * | 12/2001 |
| KR | 101282970 B1 | | 7/2013 |

(Continued)

OTHER PUBLICATIONS

Wiriyakul et al., A Visual Editor for Language-Independent Scripting for BPMN Modeling, 2015, IEEE, 156-161 pages. (Year: 2015).*

(Continued)

*Primary Examiner* — Linh K Pham
(74) *Attorney, Agent, or Firm* — IP & T GROUP LLP

(57) ABSTRACT

Method for providing visual scripts on a one-source multi-use support platform and computer-readable medium for performing the same disclosed. Method for providing visual scripts being executed on a one-source multi-use program development device includes dividing a page editing area of a development tool execution screen resulting from an execution of a program development device with a dividing line in response to a first user input, and setting one of the areas divided by the dividing line as a design editor area, and the other area as a script editor area, wherein the design editor area and the script editor area are displayed together on the development tool execution screen, and correlated component and script source are displayed in each of the design editor area and the script editor area.

12 Claims, 7 Drawing Sheets

(56) References Cited

U.S. PATENT DOCUMENTS

| | | | | |
|---|---|---|---|---|
| 2014/0112083 A1* | 4/2014 | Schmitt | G11C 7/18 | |
| | | | 365/189.17 | |
| 2014/0250406 A1* | 9/2014 | Seo | G06F 3/0484 | |
| | | | 715/781 | |
| 2015/0032093 A1* | 1/2015 | Kornblau | A61B 18/082 | |
| | | | 606/31 | |
| 2018/0107460 A1* | 4/2018 | Takata | G06T 11/60 | |
| 2018/0174020 A1* | 6/2018 | Wu | G06N 3/044 | |
| 2020/0088152 A1* | 3/2020 | Alloin | F03B 15/00 | |
| 2020/0112020 A1* | 4/2020 | Yu | H01M 4/483 | |
| 2021/0036933 A1* | 2/2021 | Tofighbakhsh | H04W 16/18 | |
| 2022/0132458 A1* | 4/2022 | Burrell | H04W 4/029 | |
| 2022/0382963 A1* | 12/2022 | Liu | G06F 40/143 | |
| 2023/0080034 A1* | 3/2023 | Yagi | A61F 13/15764 | |
| | | | 198/375 | |
| 2023/0086778 A1* | 3/2023 | Wang | G06F 3/0488 | |
| | | | 715/763 | |

FOREIGN PATENT DOCUMENTS

| | | | | |
|---|---|---|---|---|
| KR | 20140019627 A | | 2/2014 | |
| KR | 20150099318 A | | 8/2015 | |
| KR | 20230032230 A | * | 8/2022 | |
| KR | 20230041454 A | | 3/2023 | |

OTHER PUBLICATIONS

Wang et al., A New Method of Virtual Reality Based on Unity3D, 2024, IEEE, 5 page. (Year: 2024).*

* cited by examiner

METHOD FOR PROVIDING VISUAL SCRIPTS ON A ONE- SOURCE MULTI-USE SUPPORT PLATFORM AND COMPUTER-READABLE MEDIUM FOR PERFORMING THE SAME

CROSS-REFERENCE TO RELATED APPLICATION

This patent document claims the priority and benefits of Korean patent application Nos. KR 10-2023-0061502 and KR 10-2023-0189288 filed on May 12, 2023 and Dec. 22, 2023, respectively. The entire disclosure of each of the foregoing applications is incorporated herein by reference in its entirety.

TECHNICAL FIELD

The present invention relates to method for providing visual scripts on a one-source multi-use support platform and computer-readable medium for performing the same.

RELATED ARTS

With the advancement of computer technology, there is a wide variety of software being developed today. To develop software, a program development device is generally used. Previously, developers had to do a lot of manual coding, but now, software is developed more easily using a graphical user interface (GUI).

When developing a program, objects such as buttons, boxes, grids, scroll views that are graphically placed at specific locations on the screen often need to be repositioned, changed to a different parent object, or reordered among siblings, but conventional program development devices have limitations that editing objects like these was not easy.

As a related patent, Korean Patent No. 10-1282970, filed by the present applicant, discloses a situation-aware positioning device and method for screen objects during program development.

The matters described in the related art are for understanding the background of the invention, and cannot be assumed to be prior art already known to those skilled in the art in the field to which this technology belongs.

SUMMARY

The present invention is to provide a method for providing visual scripts on a one-source multi-use support platform and a program to perform the same, that enable simultaneous viewing of a program screen being developed and the corresponding script during the program screen development process, in supporting multi-browser, multi-device, and multi-OS with OSMU (One Source Multi Use).

The present invention is to provide a method for providing visual scripts on a one-source multi-use support platform and a program to perform the same, that enable a developer to easily view the source code corresponding to each component on a program screen, by focusing the source code of a script corresponding to the component on the program screen selected by user input during simultaneous output of the program screen under development and the corresponding script, or by focusing a component on the program screen corresponding to the source code of a script selected by user input.

Other objectives of the present invention will be readily understood through the following description.

According to one aspect of the present invention, there is provided a non-transitory computer-readable medium storing computer executable instructions for performing a method for providing visual scripts being executed on a one-source multi-use program development device, including: (a) dividing a page editing area of a development tool execution screen resulting from an execution of a program development device with a dividing line in response to a first user input, and (b) setting one of the areas divided by the dividing line as a design editor area that intuitively shows a page configuration of a program screen to be developed, and the other area as a script editor area that shows a script source related to a configuration of the program screen, wherein the design editor area and the script editor area are displayed together on the development tool execution screen, and correlated component and script source are displayed in each of the design editor area and the script editor area, wherein the method further comprises prioritizing components in a page configuration screen displayed in the design editor area when a scrolling action occurs in the design editor area; and moving a script focus so that a script source for a component with the highest priority is displayed in the script editor area.

The dividing line may be moved according to a second user input to adjust a ratio occupied by the design editor area and the script editor area.

A design editor area hiding button that is displayed only on a mouse over may be implemented at the bottom of the script editor area, and when the design editor area hiding button is clicked, the design editor area may be hidden and the script editor area may be displayed in the entire page edit area.

The method may further include prioritizing components in a page configuration screen displayed in the design editor area when a scrolling action occurs in the design editor area, and moving a script focus so that a script source for a component with the highest priority is displayed in the script editor area.

The priority may be assigned according to an object property of the component.

Alternatively, the priority may be assigned based on a time of entry into the design editor area.

The method may further include changing a script source displayed in the script editor area when a scrolling action occurs in the script editor area, and focusing the page configuration screen of the design editor area so that a component implemented by a script source currently displayed in the script editor area is centered on the screen.

The method may further include detecting a user event, identifying a first target selected by the user event, moving a focus to a second target corresponding to the user event within an area other than an event occurrence area, and changing a way of expressing the second target.

When the event occurrence area is the design editor area, the first target may be a component and the second target may be a script source line.

When the event occurrence area is the script editor area, the first target may be a script source line and the second target may be a component.

According to another aspect of the present invention, there is provided a method for providing visual scripts being executed on a one-source multi-use program development device, including: (a) dividing a page editing area of a development tool execution screen resulting from an execution of a program development device with a dividing line in response to a first user input, and (b) setting one of the areas divided by the dividing line as a design editor area that intuitively shows a page configuration of a program screen to be developed, and the other area as a script editor area that shows a script source related to a configuration of the program screen, wherein the design editor area and the script editor area are displayed together on the development tool execution screen, and correlated component and script source are displayed in each of the design editor area and the script editor area, wherein the method further comprises prioritizing components in a page configuration screen displayed in the design editor area when a scrolling action occurs in the design editor area; and moving a script focus so that a script source for a component with the highest priority is displayed in the script editor area.

The method may further include prioritizing components in a page configuration screen displayed in the design editor area when a scrolling action occurs in the design editor area, and moving a script focus so that a script source for a component with the highest priority is displayed in the script editor area.

Alternatively, the method may further include changing a script source displayed in the script editor area when a scrolling action occurs in the script editor area, and focusing the page configuration screen of the design editor area so that a component implemented by a script source currently displayed in the script editor area is centered on the screen.

Alternatively, the method may further include detecting a user event, identifying a first target selected by the user event, moving a focus to a second target corresponding to the user event within an area other than an event occurrence area, and changing a way of expressing the second target.

Other aspects, features and advantages other than those described above will become apparent from the following drawings, claims and detailed description of the invention.

According to one embodiment of the present invention, it is advantageous to enable simultaneous viewing of a program screen being developed and the corresponding script during the program screen development process, in supporting multi-browser, multi-device, and multi-OS with OSMU.

It is also advantageous to enable a developer to easily view the source code corresponding to each component on a program screen, by focusing the source code of a script corresponding to the component on the program screen selected by user input during simultaneous output of the program screen under development and the corresponding script, or by focusing a component on the program screen corresponding to the source code of a script selected by user input.

The effects to be obtained from the invention are not limited to those mentioned above, and other effects not mentioned will be apparent to one having ordinary skill in the art to which the invention belongs from the following description.

BRIEF DESCRIPTION OF ACCOMPANYING DRAWINGS

DETAILED DESCRIPTION

Figure 1:
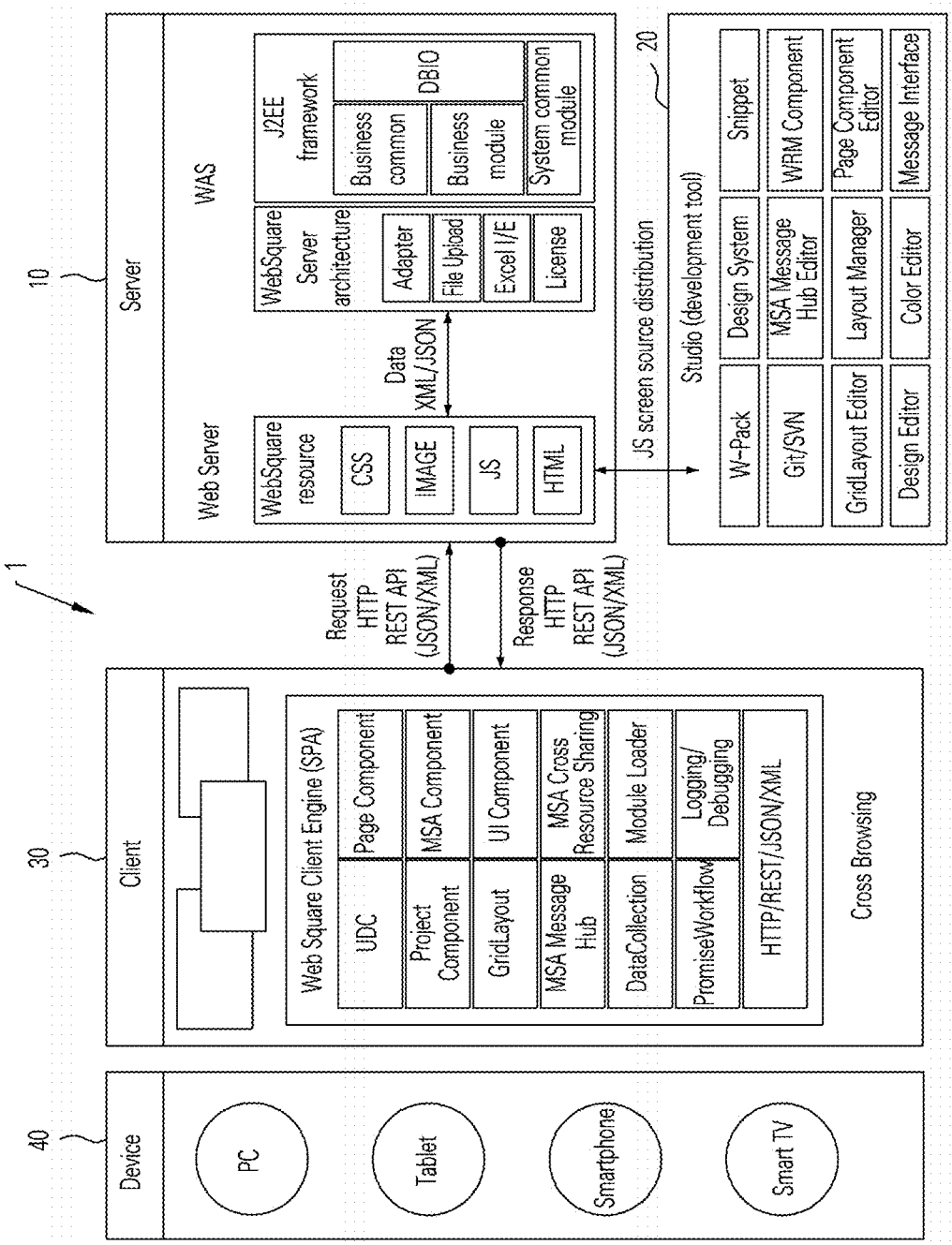
FIG. 1 illustrates the architecture of a user interface platform development system according to one embodiment of the present invention.

The invention can be modified in various forms and specific embodiments will be described below and illustrated with accompanying drawings. However, the embodiments are not intended to limit the invention, but it should be understood that the invention includes all modifications, equivalents, and replacements belonging to the concept and the technical scope of the invention.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

Terms such as first, second, etc., may be used to refer to various elements, but, these element should not be limited due to these terms. These terms will be used to distinguish one element from another element.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

As used herein, a "unit" includes a unit realized by hardware, a unit realized by software, and a unit realized by both. Further, one unit may be implemented using two or more hardware, or two or more units may be implemented using one hardware. In addition, the term "unit" is not meant to be limited to software or hardware, and the "unit" may be configured to reside on an addressable storage medium or may be configured to execute one or more processors. Thus, in one example, "~unit" may include components, such as software components, object-oriented software components, class components, and task components, processes, functions, properties, procedures, subroutines, segments of program code, drivers, firmware, microcode, circuits, data, databases, data structures, tables, arrays, and variables. The functionality provided within the components and "~units" may be combined into fewer components and "~units" or further separated into additional components and "~sub-units". In addition, the components and "~units" may be implemented to run one or more CPUs in the device.

Elements of an embodiment described below with reference to the accompanying drawings are not limited to the corresponding embodiment, may be included in another embodiment without departing from the technical spirit of the invention. Although particular description is not made, plural embodiments may be embodied as one embodiment.

In describing the invention with reference to the accompanying drawings, like elements are referenced by like reference numerals or signs regardless of the drawing numbers and description thereof is not repeated. If it is determined that detailed description of known techniques involved in the invention makes the gist of the invention obscure, the detailed description thereof will not be made.

FIG. 1 illustrates the architecture of a user interface platform development system according to one embodiment of the present invention.

The user interface platform development system 1 according to one embodiment of the present invention supports various smart device and web browser environments of clients, and the server environment supports platform independence for any web application server (WAS) supporting Java 2 Enterprise Edition (J2EE), any framework, any operating system (OS), and the like.

Hereinafter, the user interface platform development software according to one embodiment will be referred to as WebSquare developed and marketed by the present applicant.

The user interface platform development system 1 may include a client 30 used by a user, a development tool 20 used by a developer (sometimes referred to as a "studio"), and a server 10 that responds to requests from the client 30 and enables the development tool 20 to develop WebSquare screen files.

The development tool 20 may provide an environment in which developers can develop WebSquare screen files related to business systems. A client engine may be installed in the client 30, and the client engine may display the WebSquare screen file in the browser.

Client 30 may be written in JavaScript and based on AJAX architecture. It supports dynamic execution of UI components such as grids, charts, etc. It may include utilities for communication and other UI related functions.

The client engine contained in the client 30 may have a Single Page Application (SPA) architecture.

The client engine may include modules such as UDC, Page component, Project component, MSA component, grid layout, UI component, MSA message hub, cross-MSA resource sharing, data collection, module loader, promise workflow, logging/debugging, etc.

Components are basic files that can be used to develop Pages, Project UDCs, MSA UDCs, UDCs, and TTCs. All screens in the business system can be composed of structured components to support efficient operation that can be reused anywhere.

WebSquare Page component is a basic screen file used in component form. Newly added Project UDC, MSA UDC, UDC, and TTC are supported. XML is used as the extension.

UDC stands for User Defined Component, which is registered to a palette in the studio.

TTC stands for Trust Third-part Component and supports the use of external solutions as WebSquare Page components.

Project UDC is a common function file that contains common functions used throughout the Project. It is defined in a WebSquare environment setting and is automatically loaded when a WebSquare engine is loaded.

MSA UDC is a common function file that contains common functions to support micro-frontends. It is defined in the WebSquare environment setting and loads resources from the server where the microservice is running when the corresponding WebSquare engine is loaded. Components may include built-in components, SP4 UDC components, and WebSquare components.

GridView is a built-in component, and may include Grid, Table, Combo, Input, and TabControl. This component is provided by default in WebSquare.

SP4 UDC components may include SP4 UDC and SPC TTC. As a user-defined component standard, the SP4 UDC can be added by a developer on his own. And SPC TTC is a TTC which an component products is added through collaboration with solution manufacturers.

WebSquare component may include UDC, TTC, Project UDC, and MSA UDC. UDC and TTC are Page-based user-defined components introduced to increase the reusability of UI elements (Pages) developed by developers. All Pages can be developed as components by simplifying/structuring existing Pages (XML). They can be modularized by lowering the degree of coupling between Pages.

A Project UDC is a global UDC, a component that can be called from any screen. It can be used to develop common task UDCs to maximize reuse.

MSA UDC is a UDC for micro frontend implementation, which applies MSA and enables cross-domain processing.

Data Collection is a module for intuitive, consistent, and convenient data management in the form of tables. It provides an API similar to the Grid component, allowing developers to easily manipulate data in a grid format.

Promise Workflow makes programming asynchronous processing simple and easy with an intuitive GUI that makes it less complicated and difficult to develop with HTML5.

The Server 10 stores application resources (images, HTML, JS, CSS, XML, etc.). The server architecture may include utilities for adapters, file upload/download, Excel I/E (import/export), license management, and so on. It may also include modules for framework interface such as business common, business module, DBIO, and system common.

The server 10 may be implemented independently of the OS, DBMS, and WAS to support platform independence.

Development Tool 20 provides a WYSIWYG-style integrated development environment and can support developers for easy development. A developer can draw components, add scripts, view screens, debug, etc. all at once through the development tool 20.

In addition, the development tool 20 may perform SCM (Software Configuration Management) using SVN/CVS/Git, etc. Commercial configuration management solutions can interoperate as vendor plug-ins provided by vendors.

Development tool 20 may include modules such as a W-Pack (source compiler), a design system, Snippet, Git/SVN, MSA message hub editor, WRM component, a grid layout editor, a layout manager, a Page component editor, a design editor, a code editor, a message interface, and so on. It also supports a reusable common business UDC.

When a client 30 installed on various devices (PCs, tablets, smartphones, smart TVs, etc.) makes a request (HTTP REST API (JSON/XML)) to a server 10, a web server can locate resources, exchange data with a web application server and send a response (HTTP REST API (JSON/XML)) corresponding to the request to the client 30. In the connection between the web server 10 and the development tool 20, JS screen sources may be distributed.

In one embodiment, a micro frontend architecture with MSA message broker and cross-MSA resource sharing capability may be provided to correspond to the microservice architecture (MSA).

In addition, it is possible to improve performance through Single Page Application (SPA), engine optimization (Engine Optimizer), resource optimization (W-Pack), support for processing large amounts of data, etc.

Through its open architecture, it can support any web application server, any framework, any OS, and improve development productivity through open source reuse. It also supports easy integration of various open/commercial libraries and supports integration with various security solutions.

Figure 2:
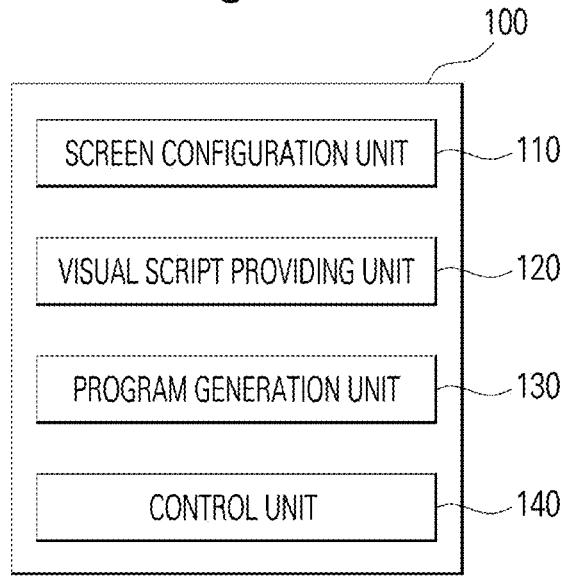
FIG. 2 is a block diagram of a program development device according to one embodiment of the present invention.
Figure 3:
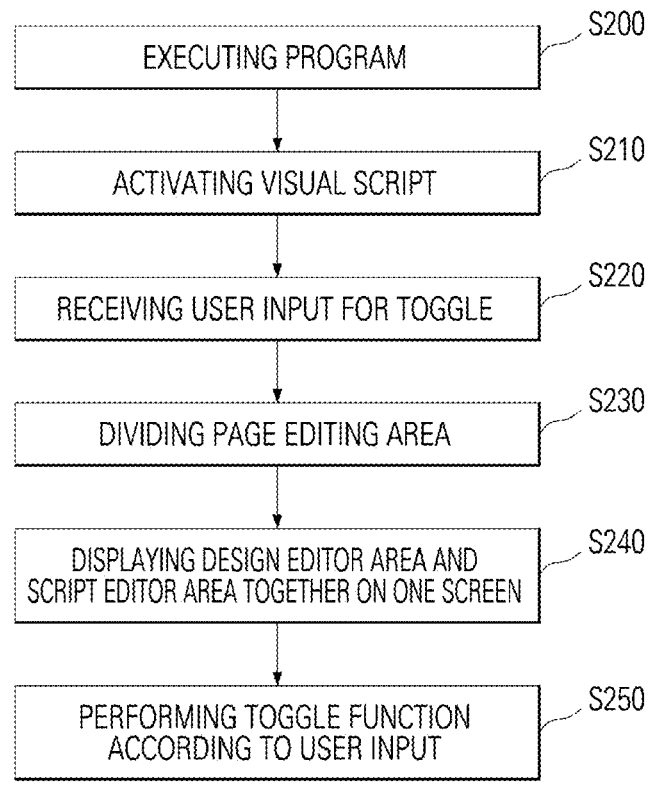
FIG. 3 and FIG. 4 are flowcharts of a method of providing visual scripts according to one embodiment of the present invention.
Figure 4:
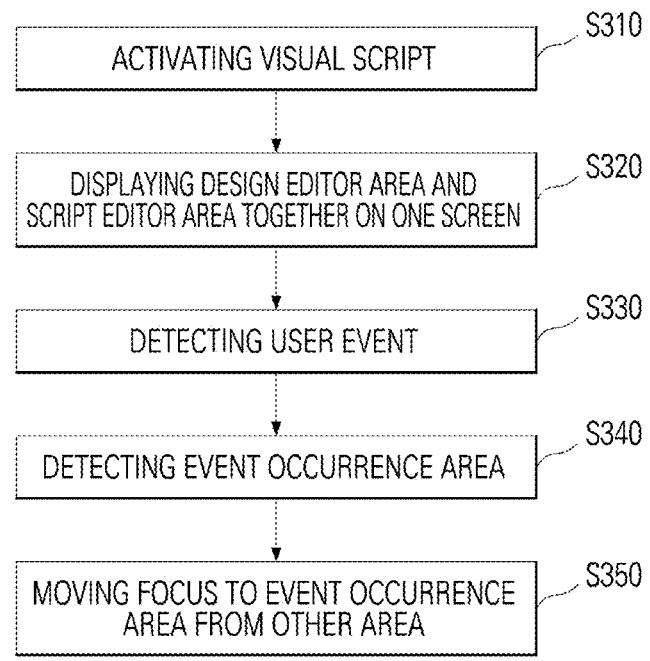
Figure 5:
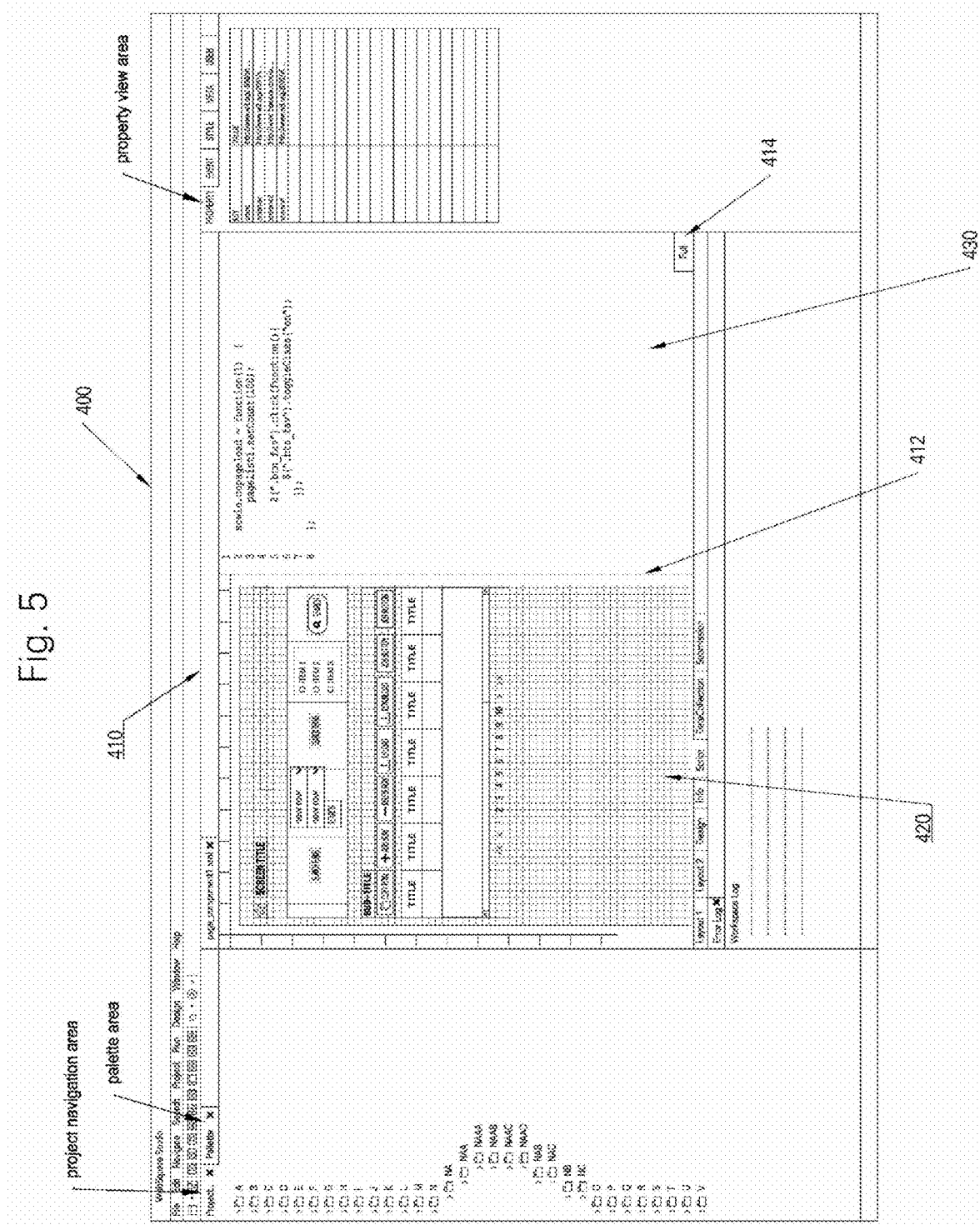
FIG. 5 is a diagram of a development tool screen with a toggle function among visual script functions.
Figure 6:
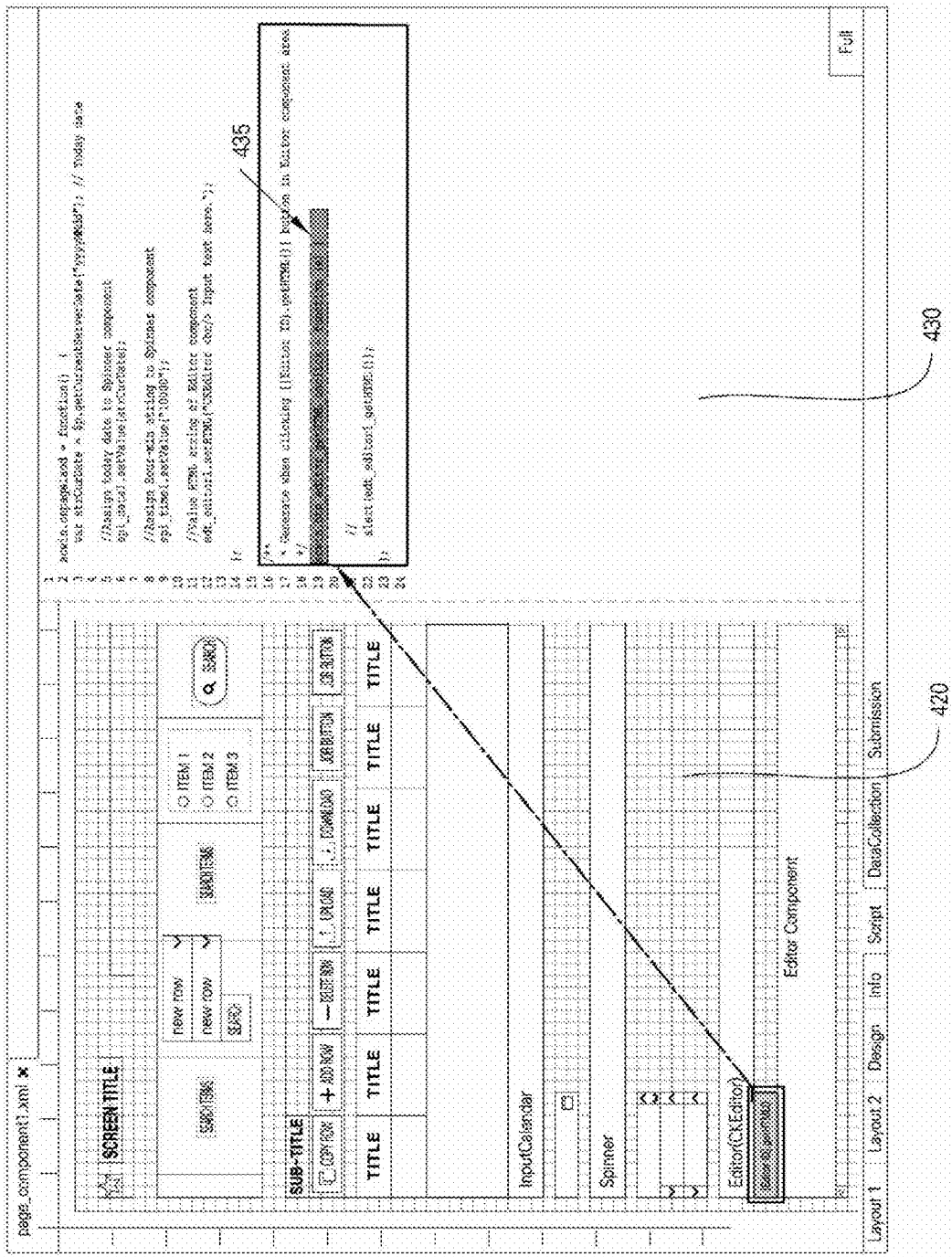
FIG. 6 and FIG. 7 are diagrams of a development tool screen with an interaction function among visual script functions.
Figure 7:
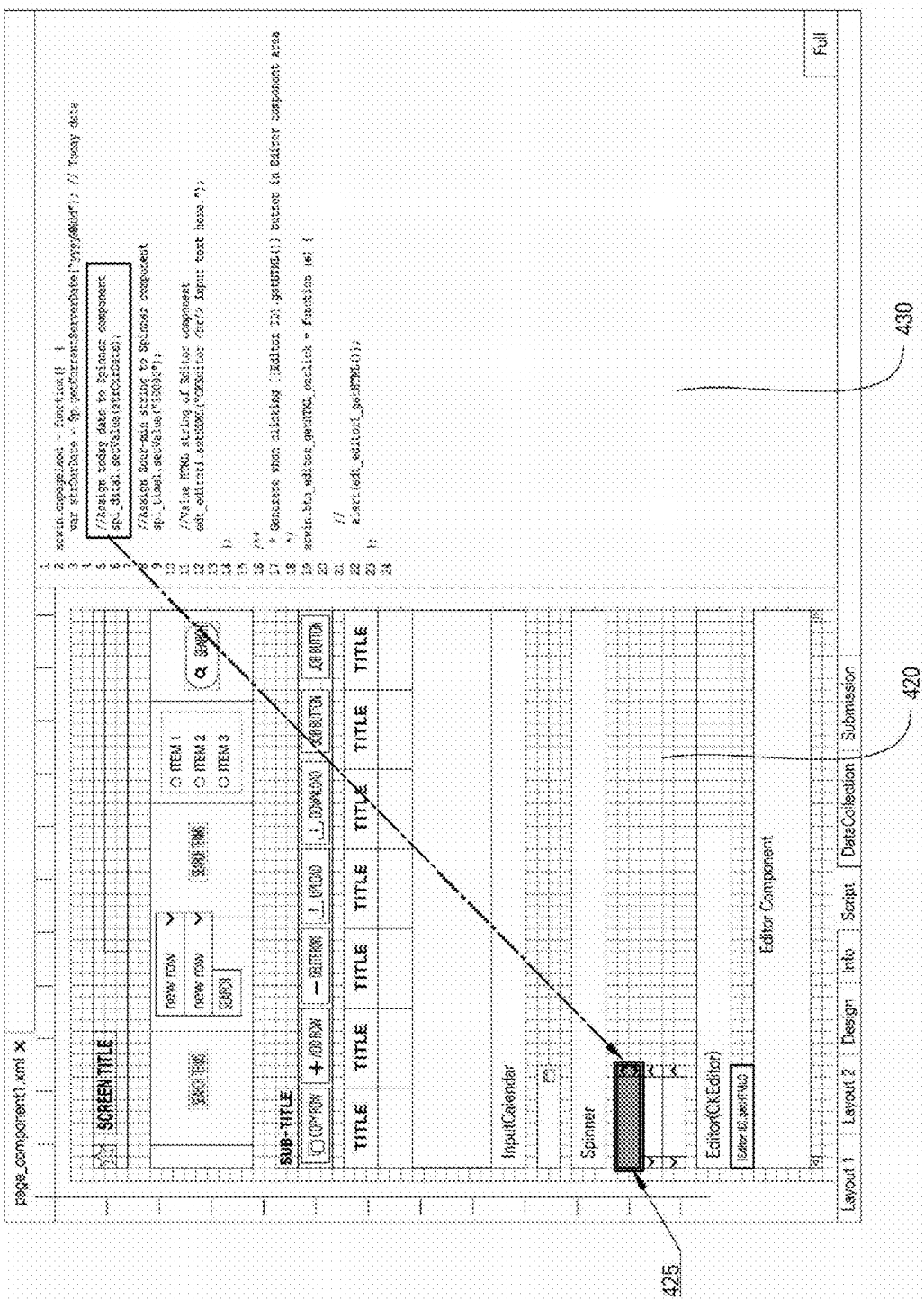

FIG. 2 is a block diagram of a program development device according to one embodiment of the present invention, FIG. 3 and FIG. 4 are flowcharts of a method of providing visual scripts according to one embodiment of the present invention, FIG. 5 is a diagram of a development tool screen with a toggle function among visual script functions, and FIG. 6 and FIG. 7 are diagrams of a development tool screen with an interaction function among visual script functions.

A program development device according to one embodiment of the present invention is software used by a developer to develop a program, corresponding to the development tool described above. A graphical user interface (GUI) enables editing operations such as intuitively creating, selecting, moving, resizing, reordering, and/or changing parents of object.

An object according to one embodiment is a component that is graphically placed in a specific location on the screen during program development. For example, it can be a button, a list box, a combo box, an edit box, a grid, a table, a scroll view, a window, and so on. A child object can be an object that is positioned by being placed on a parent object.

In particular, it is advantageous that a developer can check the page configuration of the program screen and the source code together by simultaneously displaying a design editor area that that intuitively displays the page configuration of the program screen being developed using the development tool and a script area that displays the script source for the configuration of the program screen, thereby improving the convenience of development.

Referring to FIG. 2, the program development device 100 according to one embodiment may include a screen configuration unit 110, a visual script providing unit 120, a program generation unit 130, and a control unit 140.

The screen configuration unit 110 may be configured for configuring a screen (development screen) of the program development device to be output to a display unit in a user terminal. If the content to be displayed is larger than the screen, scrolling may be used to display the content.

A user terminal is a general-purpose or specialized computing device such as a hand-held PC, a notebook computer, a laptop computer, a pad, a server, or a smartphone, and may perform certain computational operations by being equipped with a microprocessor capable of performing multimedia playback functions.

Additionally, when developing a program according to one embodiment, the user terminal may be preloaded or downloaded over the network with an application or equivalent functional program module that provides a method for providing visual scripts.

The display unit of the user terminal can be LCD, OLED, CRT, 3D display, and other flexible displays, which can output graphic information such as images and text.

The display unit of the user terminal according to one embodiment may include functions such as screen zoom-in, zoom-out, screen navigation, scrolling, and so on.

Content to be displayed on the screen of the user terminal may be preloaded in the program development device or downloaded from the Internet via network through a network connection.

Additionally, the display unit of the user terminal may be implemented as a touch screen, in which case a touch information processing unit can sense the touch point on the screen and process event information occurring at that point.

The development tool screen provided by the program development device can be divided into project navigation area, palette area, design editor area, info area, script editor area, source view area, and property view area.

In the project navigation area, Projects and files in the workspace can be viewed. Switch workspace menu may be used to view and change workspaces.

In the palette area, the components, UDCs, TTCs, and snippets provided by the program development Unit can be seen at a glance. Any component can be searched by typing the component name in a search bar.

The design editor area is the area that corresponds to the program screen, or Page, that the developer wants to develop. It is a WYSIWYG component design space in which the developer can draw the components select in the palette area.

The order of designing components is as follows.

Select a component from the palette area. Draw the selected component at the desired location in the design editor area. Edit the properties, configuration, and style of the component in the corresponding view.

The info area is an area where relevant information is registered when the developed screen is registered and used as Page component. It is possible to use tabs such as general, component, property, API, and event to register general information of the screen and page component and add properties, functions, and events of the Page component.

The script editor area is an editor area that supports JavaScript syntax (e.g., ES6, ES2020, etc.). Developers can use events and functions directly to implement complex functionality. Tooltips about function format can be provided upon mouse over. Alternatively, it is possible to use a context menu to use functions such as find/copy/format.

Also, when writing scripts in the script editor area, auto-completion can be provided when a certain key or key combinations are pressed.

The source view area is an area where source code (for example, XML source) is automatically generated and displayed for the work done in the design editor area. The source view area functions as a source code editor, allowing developers to directly check the XML source and make additional edits.

The property view area is an area where the properties of the component selected in the design editor area are displayed. When each property in the property view area is selected, information about that property can be displayed as a tooltip.

In the page editing area corresponding to the Page among the development tool screens, the above-described design editor area, the script editor area, and the source view area may be selectively displayed in a tab view format. However, in this case, in order for the developer to check the script-related content as well as the design aspect of the page currently being developed, he had to switch to a separate tab, which is inconvenient to see it at a glance.

Therefore, in one embodiment, the visual script providing unit 120 may be configured for providing a visual script that displays the program screen design for the configuration of the Page corresponding to the screen of the device on which the development program is to be executed and the script corresponding to the configuration of the page together so that they can be viewed on one screen.

Visual scripts can be used to create scripts right away without switching screens while checking the components in the design editor area.

Detailed functions of the visual script may include a toggle function and an interaction function, which will be described in detail later with reference to the related drawings.

The program generation unit 130 may be configured for compiling a program developed by use of the visual script function into an executable file.

The control unit 140 may be configured for controlling the screen configuration unit 110, the visual script providing unit 120, and the program generation unit 130 to perform their respective functions while interoperating with each other.

Referring to FIG. 3, a method for providing visual scripts when a toggle function is applied among the visual script functions is illustrated.

Assuming that the program development device 100 is executed (step S200), and the visual script is activated by the visual script providing unit 120 (step S210).

When a user input to activate the toggle function is received (step S220) the visual script providing unit 120 may split the page editing area 410 of the development tool execution window 400 (step S230).

The page editing area 410 may be divided into two areas by a dividing line 412. One area may be assigned to the design editor area 420, and the other area may be assigned to the script editor area 430.

Thus, the design editor area 420 and the script editor area 430 may be output together on one screen (step S240).

In FIG. 5, a case is illustrated where the dividing line 412 is implemented as a vertical line, with the area on the left assigned to the design editor area 420 and the area on the right assigned to the script editor area 430. However, it is of course possible for the dividing line to be implemented as a horizontal line in addition to the vertical line.

The following additional toggling functions may then be performed in response to user input (step S250).

The dividing line 412 may be moved by user input, such as mouse click-and-drag or touch-drag. When the dividing line 412 is moved, the size of the two areas divided by the dividing line 412, i.e., the ratio occupied by the two areas, may be adjusted. Thus, a developer can allow a larger screen to be allocated for either of the design editor area 420 and the script editor area 430 that are displayed together on a single screen.

When the toggle function is activated, a button or icon (hereinafter collectively referred to as a 'button') for a certain function may be provided at the bottom of the script editor area 430. The button 414 is a design editor area hiding button that serves to hide the design editor area 420, so that when selected, the design editor area 420 will be hidden and the script editor area 430 will take up the entirety of the page editing area 410 so that only the script content is displayed.

The design editor area hiding button 414 can also be implemented to be visible only on mouse over.

Next, referring to FIG. 4, a method of providing a visual script is illustrated when the interaction feature of the visual script is applied.

When visual scripting is activated (step S310), the design editor area 420 and the script editor area 430 may be displayed together on a single screen (step S320).

Correlated components and script sources may be displayed in each of the design editor area 420 and the script editor area 430. Accordingly, the components drawn in the design editor area 420 and the lines of the script source displayed in the script editor area 430 correspond to each other, making it easier for the developer to visually understand the interrelationships.

If the page configuration screen in which the design editor area 420 is currently displayed is scrolled up or down by scrolling actions, the script sources for the components currently displayed within the design editor area 420 may be displayed within the script editor area 430.

In this case, the components in the page configuration screen displayed within the design editor area 420 may be prioritized, and a script focus may be shifted such that the script source for the component with the highest priority is displayed in the script editor area 430. Priority can be assigned according to the object properties of the component. For example, a parent object may have a higher priority, and a child object may have a lower priority.

Alternatively, priority may be assigned based on the time of entry into the design editor area 420. A high priority may be assigned to a component that has newly entered the design editor area 420 through a scrolling action, and a script source related to the component may be displayed in the script editor area 430.

This can be similarly applied in the opposite case. That is, if the script source currently displayed in the script editor area 430 changes as the script editor area 430 is scrolled, the page configuration screen of the design editor area 420 may be focused so that the component implemented by the script source currently displayed within the script editor area 430 becomes the center of the screen.

Next, the visual script providing unit 120 may be configured for detecting a user event (step S330). The user event may be a user input, such as a mouse click, touch, or the like.

Among the two divided areas, the area where the user event occurred is identified (step S340). Since the page editing area 410 is divided into the design editor area 420 and the script editor area 430, it is possible to identify in which of the two areas the user event occurred.

Additionally, the first target selected by the user event is identified. When a user event occurs in the design editor area 420 (the first event), the first target is a component, and when a user event occurs in the script editor area 430 (the second event), the first target is the script source line.

The focus is moved from an area other than the event occurrence area to a second target corresponding to the user event (step S350). And by changing way of expressing the second target, the developer can identify the second target related to the first target at a glance. The second target is a part related to the first target. If the first target is a component, the second target is a script source line, and if the first target is a script source line, the second target is a component.

As in the first event, when any of the components drawn in the design editor area 420 is selected (by mouse click, touch, etc.), the script focus may be moved to one of the lines or functions of the script source related to the component. Here, the script focus may be the cursor. Alternatively, the script focus may highlight the line or function.

The line to which the script focus moves may be the first of the lines in the script source for the function related to the component. If an annotation is included in the script source for a function, the script focus may move to the first line among the coding lines corresponding to the actual program code, excluding the annotation.

Additionally, if there are more than one script source line containing the component ID for the corresponding component, the script focus moves to the script source line where the component ID first appears by default. Afterwards, depending on user input, the script focus can be moved to another script source line where the corresponding component ID appears.

Referring to FIG. 6, if [Editor ID].getHTML( ) button component is selected in the design editor area 420 among the two divided areas in the page editing area 410, the script focus 435 is moved to the line for that button component (line 19) in the script editor area 430.

Next, if any line is selected (by mouse click, touch, etc.) among the script sources displayed in the script editor area 430 as in the second event, the component related to that source line among the components in the design editor area 420 may be focused.

By analyzing the selected script source line, the component ID included in the source line can be read to identify the component to be focused on. Alternatively, the component to be focused may be identified by finding information about the component related to the event processed by the function block containing the selected script source line.

Referring to FIG. 7, when a line related to a date string in the Spinner component is selected in the script editor area 430 of the two divided areas in the page editing area 410, the component 425 about the date string in the Spinner component in the design editor area 420 may be expressed in a way that is distinct from other components.

Various effects can be applied, such as changing to a pre-designated color, changing the font type, blinking effect, neon effect, shadow effect, and rotation effect, as the way of expressing the related component.

The program development device according to one embodiment allows developers to view the screen design and script for the program screen they want to develop on a single screen, and allows them to check the components of the design and write a script at the same time, thereby improving the developer's usability to enable easy and intuitive development.

Figure 8:
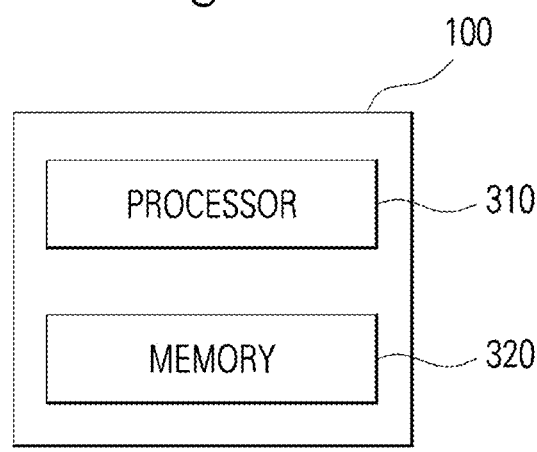
FIG. 8 illustrates the configuration of a system according to one embodiment of the present invention.

FIG. 8 illustrates the configuration of a system according to one embodiment of the present invention.

Referring to FIG. 8, the program development device 100 may include a processor 310 and a memory 320. The memory 320 may store one or more instructions executable by the processor 310. The processor 310 may execute the one or more instructions stored in the memory 320. By executing the instructions, the processor 310 can perform one or more of the operations described above with reference to FIGS. 3 through 7. Additionally, a configuration of the present invention described above with reference to FIG. 2 may be a configuration implemented by instructions executed by the processor 310.

The aforementioned embodiments may be realized by a hardware component, a software component, and/or a combination of hardware and software components. For example, the device and components described in the embodiments may be realized using one or more general-purpose computers or special-purpose computers such as, for example, a processor, a controller, a central processing unit (CPU), a graphics processing unit (GPU), an arithmetic logic unit (ALU), a digital signal processor, a microcomputer, a field programmable array (FPA), a programmable logic unit (PLU), a microprocessor, an application specific integrated circuits (ASICS) or other devices implementing instructions and responding thereto.

The aforementioned method of providing visual scripts may also be implemented in the form of a recording medium including computer-executable instructions, such as an application or program module executed by a computer. The computer-readable medium can be any available medium that can be accessed by a computer, and includes both volatile and non-volatile media, and removable and non-removable media. Further, the computer-readable medium may include a computer storage medium. The computer storage medium includes both volatile and non-volatile, removable and non-removable media implemented with any method or technology for storing information such as computer-readable instructions, data structures, program modules, or other data.

The aforementioned method of providing visual scripts may be executed by an application installed by default on the terminal (which may include programs included in platforms or operating systems that are basically installed in the terminal), or it may be executed by an application (i.e., a program) installed by the user directly on the master terminal through an application delivery server, such as an application store server, an application or a web server associated with such a service. In this sense, the aforementioned method of providing visual scripts may be implemented by an application (i.e., a program) installed by default on the terminal or installed directly by the user, and recorded on a computer-readable recording medium such as the terminal.

While the invention has been described above with reference to exemplary embodiments, it will be understood by those skilled in the art that the invention can be modified and changed in various forms without departing from the concept and scope of the invention described in the appended claims.

What is claimed is:

1. A non-transitory computer-readable medium storing computer executable instructions for performing a method for providing visual scripts being executed on a one-source multi-use program development device, comprising:

(a) dividing a page editing area of a development tool execution screen resulting from an execution of a program development device with a dividing line in response to a first user input; and (b) setting one of the areas divided by the dividing line as a design editor area that intuitively shows a page configuration of a program screen to be developed, and the other area as a script editor area that shows a script source related to a configuration of the program screen, wherein the design editor area and the script editor area are displayed together on the development tool execution screen, and correlated component and script source are displayed in each of the design editor area and the script editor area, and wherein the method further comprises:

prioritizing components in a page configuration screen displayed in the design editor area when a scrolling action occurs in the design editor area; and moving a script focus so that a script source for a component with the highest priority is displayed in the script editor area.

2. The non-transitory computer-readable medium of claim 1, wherein the dividing line is moved according to a second user input to adjust a ratio occupied by the design editor area and the script editor area.

3. The non-transitory computer-readable medium of claim 1, wherein a design editor area hiding button that is displayed only on a mouse over is implemented at the bottom of the script editor area, and when the design editor area hiding button is clicked, the design editor area is hidden and the script editor area is displayed in the entire page edit area.

4. The non-transitory computer-readable medium of claim 1, wherein the priority is assigned according to an object property of the component.

5. The non-transitory computer-readable medium of claim 1, wherein the priority is assigned based on a time of entry into the design editor area.

6. The non-transitory computer-readable medium of claim 1, further comprising:
   (c) changing a script source displayed in the script editor area when a scrolling action occurs in the script editor area; and
   (d) focusing the page configuration screen of the design editor area so that a component implemented by a script source currently displayed in the script editor area is centered on the screen.

7. The non-transitory computer-readable medium of claim 1, further comprising:
   (c) detecting a user event;
   (d) identifying a first target selected by the user event;
   (e) moving a focus to a second target corresponding to the user event within an area other than an event occurrence area; and
   (f) changing a way of expressing the second target.

8. The non-transitory computer-readable medium of claim 7, wherein when the event occurrence area is the design editor area, the first target is a component and the second target is a script source line.

9. The non-transitory computer-readable medium of claim 7, wherein when the event occurrence area is the script editor area, the first target is a script source line and the second target is a component.

10. A method for providing visual scripts being executed on a one-source multi-use program development device, comprising:
    (a) dividing a page editing area of a development tool execution screen resulting from an execution of a program development device with a dividing line in response to a first user input; and
    (b) setting one of the areas divided by the dividing line as a design editor area that intuitively shows a page configuration of a program screen to be developed, and the other area as a script editor area that shows a script source related to a configuration of the program screen,
    wherein the design editor area and the script editor area are displayed together on the development tool execution screen, and correlated component and script source are displayed in each of the design editor area and the script editor area, and
    wherein the method further comprises:
    prioritizing components in a page configuration screen displayed in the design editor area when a scrolling action occurs in the design editor area; and
    moving a script focus so that a script source for a component with the highest priority is displayed in the script editor area.

11. The method of claim 10, further comprising:
    (c) changing a script source displayed in the script editor area when a scrolling action occurs in the script editor area; and
    (d) focusing the page configuration screen of the design editor area so that a component implemented by a script source currently displayed in the script editor area is centered on the screen.

12. The method of claim 10, further comprising:
    (c) detecting a user event;
    (d) identifying a first target selected by the user event;
    (e) moving a focus to a second target corresponding to the user event within an area other than an event occurrence area; and
    (f) changing a way of expressing the second target.

* * * * *